United States Patent
Gao et al.

(10) Patent No.: US 12,259,914 B1
(45) Date of Patent: Mar. 25, 2025

(54) QUESTIONS DISAMBIGUATION USING GENERATIVE EVIDENCE FUSION AND ROUND-TRIP PREDICTION

(71) Applicant: Amazon Technologies, Inc., Seattle, WA (US)

(72) Inventors: Yifan Gao, Yangzhou (CN); Henghui Zhu, Jersey City, NJ (US); Ramesh M. Nallapati, New Canaan, CT (US); Patrick Ng, Rego Park, NY (US); Cicero Nogueira Dos Santos, Glen Ridge, NJ (US); Zhiguo Wang, Syosset, NY (US); Feng Nan, Great Neck, NY (US); Dejiao Zhang, Jersey City, NJ (US); Andrew Oliver Arnold, New York, NY (US); Bing Xiang, Mount Kisco, NY (US)

(73) Assignee: Amazon Technologies, Inc., Seattle, WA (US)

( * ) Notice: Subject to any disclaimer, the term of this patent is extended or adjusted under 35 U.S.C. 154(b) by 344 days.

(21) Appl. No.: 17/240,724

(22) Filed: Apr. 26, 2021

(51) Int. Cl.
| | |
|---|---|
| G06F 16/332 | (2019.01) |
| G06F 16/3329 | (2025.01) |
| G06F 40/20 | (2020.01) |
| G06N 3/045 | (2023.01) |
| G06N 5/04 | (2023.01) |
| G06N 20/00 | (2019.01) |

(52) U.S. Cl.
CPC .......... *G06F 16/3329* (2019.01); *G06F 40/20* (2020.01); *G06N 3/045* (2023.01); *G06N 5/04* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 11,599,769 B2* | 3/2023 | Fang | G06F 16/252 |
| 12,062,368 B1* | 8/2024 | Arora | G10L 15/063 |
| 2014/0280087 A1* | 9/2014 | Isensee | G06F 16/24578 |
| | | | 707/723 |
| 2018/0239811 A1* | 8/2018 | Cai | G06F 16/3329 |
| 2018/0260472 A1* | 9/2018 | Kelsey | G06F 40/56 |
| 2020/0043026 A1* | 2/2020 | Cruz-Rivera | G06N 5/04 |
| 2021/0056150 A1* | 2/2021 | Karandish | G06F 16/3329 |
| 2021/0201192 A1* | 7/2021 | Kim | G06N 3/045 |
| 2021/0216577 A1* | 7/2021 | Xiao | G06F 16/3329 |
| 2021/0232948 A1* | 7/2021 | Otsuka | G06N 3/047 |
| 2022/0147718 A1* | 5/2022 | Kim | G06N 5/04 |
| 2022/0309107 A1* | 9/2022 | Sen | G06F 40/35 |

(Continued)

FOREIGN PATENT DOCUMENTS

CN 115114416 A * 9/2022

*Primary Examiner* — Richa Sonifrank
(74) *Attorney, Agent, or Firm* — Nicholson De Vos Webster & Elliott LLP

(57) ABSTRACT

Techniques for predicting an answer to a question using a machine learning model are described. In some examples, the model predicts one or more answers to the question by: predicting at least two answers to the question using a first component of the question-answer model from a set of passages, generating, using a second component of the question-answer model, at least one question for each of the predicted at least two answers, and performing roundtrip predictions until each generated question only has one answer.

19 Claims, 10 Drawing Sheets

(56) References Cited

U.S. PATENT DOCUMENTS

| | | | |
|---|---|---|---|
| 2022/0309246 A1* | 9/2022 | Murdock, IV | G06F 40/35 |
| 2022/0318230 A1* | 10/2022 | Sikka | G06F 40/166 |
| 2022/0327287 A1* | 10/2022 | Agrawal | G06F 40/216 |
| 2022/0358851 A1* | 11/2022 | Wang | G06N 3/0442 |
| 2023/0325607 A1* | 10/2023 | Morimoto | G06F 16/3329 |
| | | | 704/9 |

* cited by examiner

US 12,259,914 B1

QUESTIONS DISAMBIGUATION USING GENERATIVE EVIDENCE FUSION AND ROUND-TRIP PREDICTION

BACKGROUND

Open-domain Question Answering (QA) is the task of answering questions using a large collection of passages with diverse topics. Unlike reading comprehension in which a single passage is provided for each question, open-domain QA is more challenging because the passage containing the evidence is not known beforehand-systems need to go through a huge collection of passages to find a correct answer. Because open-domain questions are usually asked by people who want to seek information, the questions are highly likely to be ambiguous because people may not have the knowledge of relevant topics when formulating them.

BRIEF DESCRIPTION OF DRAWINGS

Various embodiments in accordance with the present disclosure will be described with reference to the drawings, in which.

DETAILED DESCRIPTION

The present disclosure relates to methods, apparatus, systems, and non-transitory computer-readable storage media for predicting answers to questions. In open-domain question answering, questions are highly likely to be ambiguous because users may not know the scope of relevant topics when formulating them. Therefore, a system should try to find every possible interpretation of the question and propose a set of disambiguated question-answer (QA) pairs. For example, consider the following query of "When does X come out?" If X is a title of a book and a title of a movie, multiple answers may be possible.

Detailed herein are embodiments of a model architecture that aggregates and combines evidence from multiple passages to predict question-answer pairs. Particularly, embodiments of the model read a large number of passages to find as many interpretations as possible. In addition, a novel round-trip prediction approach is to predict additional interpretations that may not be found in a first pass. These interpretations may be verified and filtered to weed out incorrect question-answer pairs to arrive at a final disambiguated output.

Figure 1:
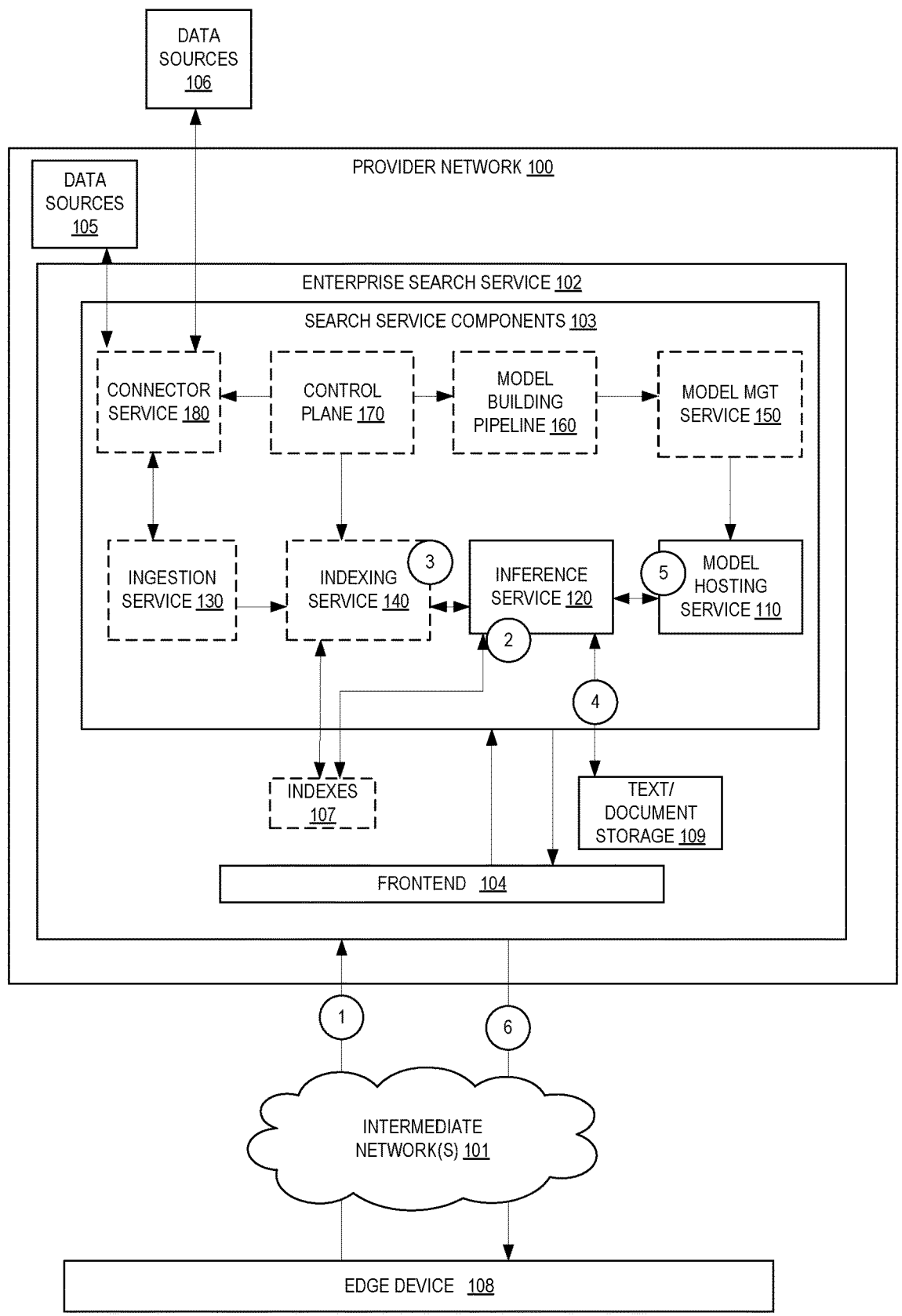
FIG. 1 illustrates embodiments of an enterprise search service.

FIG. 1 illustrates embodiments of an enterprise search service. The enterprise search service 102 allows for the querying or searching of documents and/or proper subsets thereof of an enterprise using one or more machine learning models. Details of various aspects of this enterprise search service 102 are discussed below. An aspect of the search service is to predict answers to user questions.

Prior to any searching, the documents and/or proper subsets thereof have been ingested prior to such querying. In some embodiments, the enterprise search service 102 provides the capability to ingest documents from data sources 105 internal to a provider network 100 and data sources 106 external to the provider network 100 (e.g., stored at a third-party location, stored locally, etc.).

An ingestion service 130 allows for the ingestion of documents into the enterprise search service 102. Documents may be pulled from data sources (e.g., in response to a request) and/or pushed from data sources (e.g., a synchronization of when a document is added or altered). The ingestion service 130 may also fetch access control lists (ACLs) associated with the documents. The ACLs can be used to determine if a search result is allowed to be served.

To get documents from the data sources 105 or 106, the ingestion service couples to a connector service 180 which offers a plurality of connectors to connect to different data sources and receive data (as a push or a pull) from those sources according to the appropriate protocol for a particular data source. Note that different data sources may use different transmission protocols, storage protocols, encryption protocols, etc.

The data connectors of the connector service 180 are configured using a control plane 170. This control plane 170 contains workflows for resource management of the enterprise search service 102. The control plane 170 may also be used to configure a model building pipeline 160 which builds specific models, vocabularies, and embeddings to be hosted in the model hosting service 110 and used in answering a query. Note that in some embodiments, a model management service 150 may be used to refresh a given model.

The ingestion service 130 also extracts text from documents, pre-processes the extracted text (e.g., tokenize, normalize, and/or remove noise), and calls an indexing service to generate index entries for text, and causes the documents (or subset thereof) to be stored. The indexing service 140 indexes documents that have been acquired by the ingestion service 130 into one or more indexes 107. An index is a data structure of organized data that maps the data to a plurality of fields. Each document or subset of a document (e.g., passage) is identified with a unique identifier. In some embodiments, the index is comprised a plurality of JSON documents.

In some embodiments, the index is an inverted index that lists every unique word that appears in any document and identifies all of the documents each word occurs in. An index can be thought of as an optimized collection of documents and each document is a collection of fields, which are the key-value pairs that contain data. Each indexed field has a dedicated, optimized data structure. For example, text fields are stored in inverted indices, and numeric and geo fields are stored in BKD trees.

The indexing service 140 may be schema-less, which means that documents can be indexed without explicitly specifying how to handle each of the different fields that might occur in a document. When dynamic mapping is enabled, the indexing service 140 automatically detects and adds new fields to the index. However, as noted below, a schema of reserved fields may be used to map detected data into datatypes. The reserved fields allow for the distinguishing between full-text string fields and exact value string fields, performing language-specific text analysis, optimizing fields for partial matching, and/or the use datatypes that are not automatically detected.

Once a set of documents has been indexed, a query against that set of documents may be made via an inference service 120. The inference service 120 handles search queries from end users by performing query understanding (query classification and enrichment), invoking the indexing service 140 to get a relevant set of documents for the query, retrieving the relevant set of documents, and invoking one or more models of the model hosting service 110 to deduce a search result for given query.

Examples of models utilized by the inference service 120 that are run in the model hosting service 110 include, but are not limited to one or more of a question-answer (e.g., reading comprehension) which extracts answers from passages and a document/passage ranking model which sorts documents in an order of relevance with respect to the query.

A frontend 104 of the enterprise search service 103 couples to one or more search service components 103 to provide a way for external communications (e.g., from edge device 108, etc.) with the enterprise search service 102. For example, through the frontend 104 a user may communicate with the ingestion service 130 to configure and start an ingestion of one or more documents, provide a query to be served by the inference service 120, etc.

As shown, in some embodiments the enterprise search service 102 is a service provided by a provider network 100. The provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services, such as a hardware virtualization service that can execute compute instances, a storage service that can store data objects, etc. The users (or "customers") of provider networks 100 may utilize one or more user accounts that are associated with a customer account, though these terms may be used somewhat interchangeably depending upon the context of use. Users may interact with a provider network 100 across one or more intermediate networks 101 (e.g., the internet) via one or more interface(s), such as through use of application programming interface (API) calls, via a console implemented as a website or application, etc. The interface(s) may be part of, or serve as a front-end to, a control plane (e.g., control plane 170) of the provider network 100 that includes "backend" services supporting and enabling the services that may be more directly offered to customers.

For example, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region may be a geographical area in which the cloud provider clusters data centers. Each region can include multiple (e.g., two or more) availability zones (AZs) connected to one another via a private high-speed network, for example a fiber communication connection. An AZ may provide an isolated failure domain including one or more data center facilities with separate power, separate networking, and separate cooling from those in another AZ. Preferably, AZs within a region are positioned far enough away from one another that a same natural disaster (or other failure-inducing event) should not affect or take more than one AZ offline at the same time. Customers can connect to AZ of the cloud provider network via a publicly accessible network (e.g., the Internet, a cellular communication network).

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance (e.g., provided by a hardware virtualization service) hosted by the provider network to perform a variety of computing tasks. Additionally, or alternatively, a user may indirectly utilize a compute instance by submitting code to be executed by the provider network (e.g., via an on-demand code execution service), which in turn utilizes a compute instance to execute the code typically without the user having any control of or knowledge of the underlying compute instance(s) involved.

Circles with numbers inside of them represent exemplary actions that may be taken for performing an inference (query). At circle 1, an inference request is sent by an edge device 108 to the enterprise search service 102. In particular, a request to find an answer to a question in a set of documents. The frontend 104 calls the inference service which begins processing the request at circle 2.

The processing of the request includes accessing one or more indexes 107 via the indexing service 140 at circle 3 to get identifiers of sets of documents to analyze, accessing the identified sets of documents (or text thereof) from document storage 109, and providing the documents (or text thereof) and the query to one or more machine learning models in the model hosting service 110 at circle 5 to determine one or more of top documents and/or a top passage.

The result of the determination by the one or more machine learning models is provided the requestor at circle 6 (subject to any restrictions). The provision of the result may also include using an enhanced display.

Figure 2:
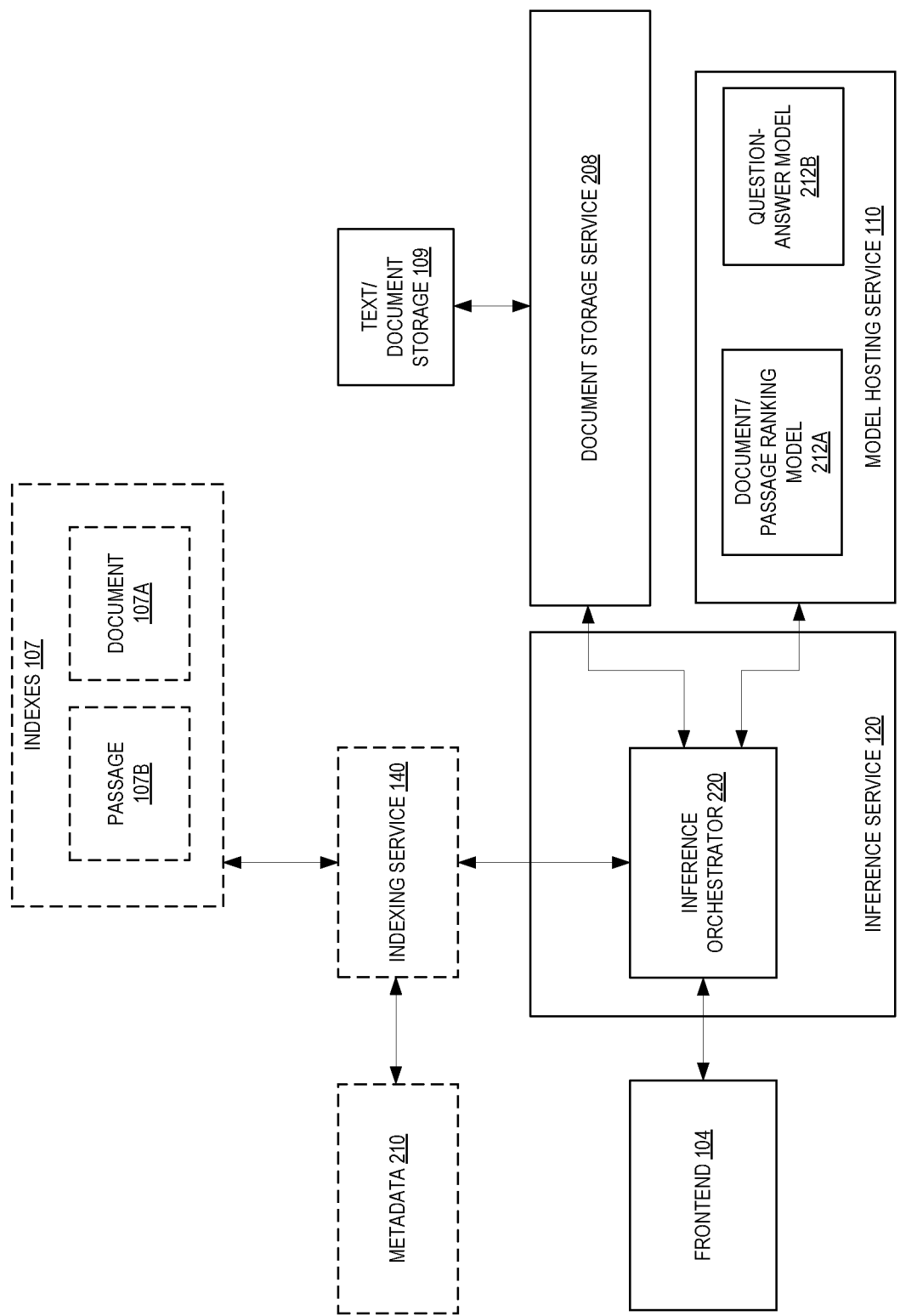
FIG. 2 illustrates embodiments of an enterprise search service used for providing inference functionality.

FIG. 2 illustrates embodiments of the enterprise search service 102 used for providing inference functionality. In particular, the aspects shown may be used to respond to a search query on a set of documents. The frontend 104 takes in a search request (or query) and provides that request to an inference orchestrator 220 of the inference service 120.

In some embodiments, the query is submitted as an application programming interface (API) call. In some embodiments, a default response to such a query includes a relevant passage and/or a relevant document. The query may contain one or more fields indicating how the search is to be performed and/or what is to be returned. This one or more fields include, for example, one or more of: an attribute filter field which enables filtered searches based on document attributes; an exclude document attributes field indicating what attributes to exclude from a response; a facets field defining what document attributes to count; an include document attributes field indicating the document attributes to include in a response; an index identifier field indicating the index(es) to search; a page number field indicating the number of pages of results to return; a page size field indicating the size of pages of results to return; a query result type configuration field which sets the type of query (e.g., passage, document); a query text field which includes a string of text to search for; and a user context field which identifies the end user making the query so it can be determined if the query result should be filtered based on the user (e.g., an access control list indicates that the user is not allowed to see the content such a regular employee searching for health records of another employee).

The inference orchestrator 220 co-ordinates various services to perform an inference using the query. In some embodiments, the inference orchestrator 220 includes a state machine or algorithm defining the actions to take. In some embodiments, the inference orchestrator 220 performs query classification and enrichment (or couples to a component that does). For example, in some embodiments, key phrases, entities, syntax, topics, and/or classifications are extracted.

The inference orchestrator 220 couples to the indexing service 140 and utilizes the indexing service 140 to access one or more indexes 107 to get matching document identifiers for the query. The indexes 107 may include a passage index 107B and/or a document index 107A. In some instances, the inference orchestrator 220 provides an indication of what index(es) to use. In some embodiments, the metadata 210 provides a physical location of the indexes 107 for the indexing service 140 to use.

The result (e.g., document identifiers) of various index queries are received by the inference orchestrator 220 to use to retrieve one or more documents for use by one or more machine learning models (e.g., question-answer model 212B, and document/passage ranking model(s) 212A) hosted by the model hosting service 110. The inference orchestrator 220 retrieves the identified documents (e.g., an entire document, passage, or FAQ) from text/document storage 109 using document storage service 208. The retrieved documents are then supplied, along with aspects of the query, to one or more of the models 212A-C of the model hosting service 110 to identify one or more of: one or more top ranked documents, one or more top ranked question-answer pairs, and/or one or more top ranked FAQs. Note that the models 212A-B provide confidence scores of their outputs in some embodiments. Note too that the document storage service 208 stores document artifacts that will be used at the time of inference to extract the answer for a given query.

Figure 3:
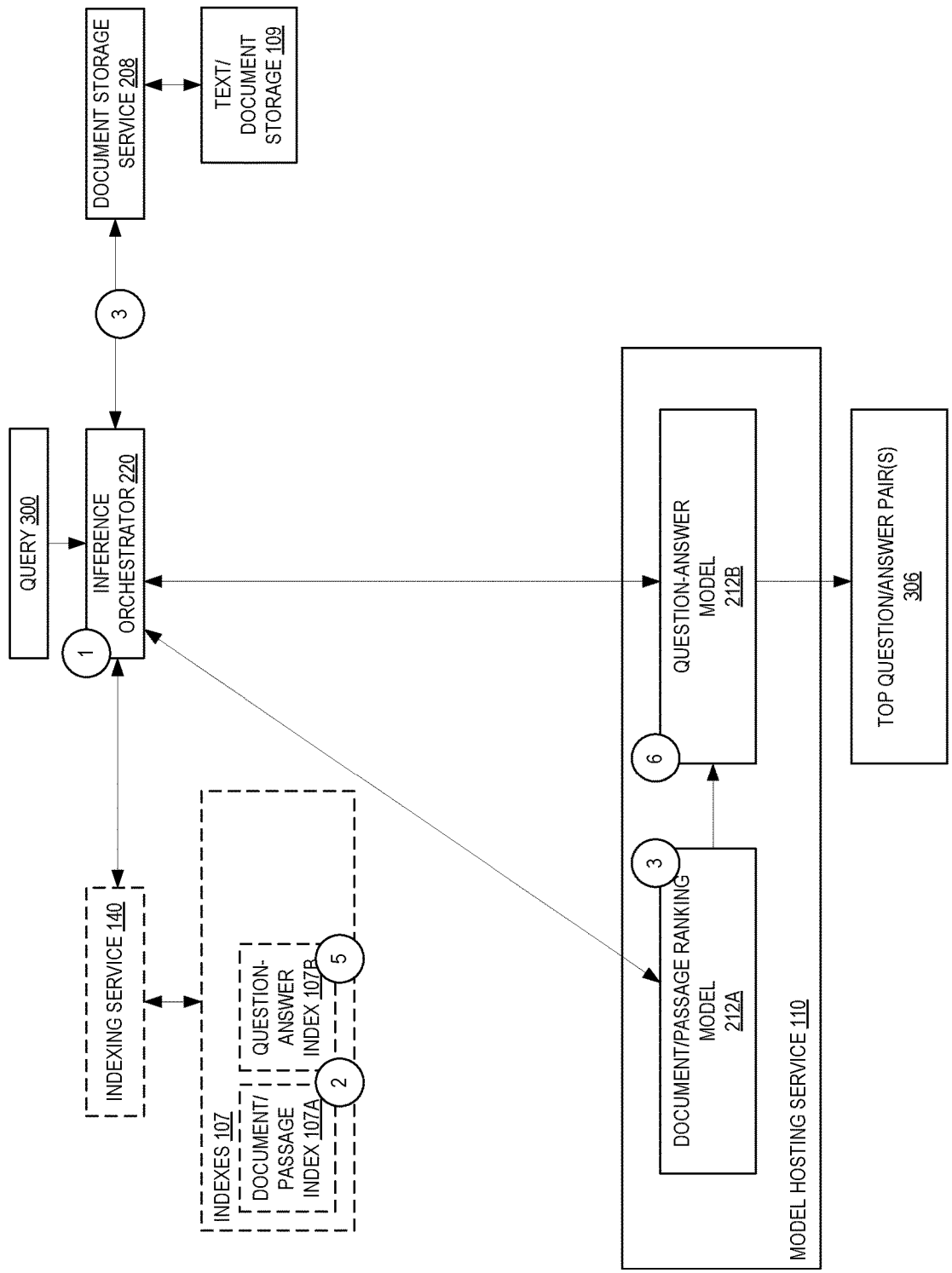
FIG. 3 illustrates embodiments of an enterprise search service used for providing inference functionality.

FIG. 3 illustrates embodiments of the enterprise search service 102 used for providing inference functionality. A query 300 is received by the inference orchestrator 220. This is shown at circle 1.

In some embodiments, the query is fired against the document index 107A and the passage index 107B (shown at circle 2). In some embodiments, an identification of an initial set of "top" documents (e.g., top 1,000 documents) and "top" passages (e.g., 5,000 passages) are provided from the indexing service 140 back to the inference orchestrator 220. The associated documents and passages are retrieved (shown at circle 3) and then sent to the document/passage ranking model(s) 212A.

The document/passage ranking model(s) 212A analyzes and re-ranks the top documents based on relevance scores and, for a top subset (e.g., 100) of the ranked documents, determines a set number (e.g., 3) of passages for each of the top subset of ranked documents (shown at circle 4). In some embodiments, a Dense Passage Retriever (DPR) is used for retrieval. In some embodiments, a feature-based deep cross network (DCN) analyzes and re-ranks the top documents. In some embodiments, a bidirectional encoder representations from transformers (BERT) model takes the top subset of documents and finds and/or reranks passages. Taking the concatenation of the prompt question and each passage as input, the reranker allows a token-level cross-attention between the prompt question and passages. A relevance score is then derived by taking the [CLS] vector of the input sequence into a linear layer. In some embodiments, when the data is purely textual documents with no metadata fields, then the DCN can be bypassed, and only the BERT used for reranking of the top 100 documents directly. Note that an output of the document/passage ranking model(s) 212A is a set of top ranking document(s) 304 and/or top ranking passages.

The question-answer model 212B determines a set of one or more top passages for the query (typically as a question-answer pair). In some embodiments, the query is fired against the passage index 107B at circle 5 to find a top number (e.g., 100) of passages which are retrieved and sent to the document/passage ranking model(s) 212A for analysis and reranking. In particular, in some embodiments, the BERT model receives the top passages and re-ranks the passages and sends a top few (e.g., 5) to the question and answer model 212B at circle 6. In other embodiments, the document/passage ranking model(s) 212A finds the top number of passages. Regardless, the question-answer model 212B operates on the query and an identified number of top passages.

In some embodiments, the question and answer model 212B is BERT-based such as BART-based. The question and answer model 212B analyzes received passages and outputs a top question-answer pair or pairs 306 that is, at times, highlighted) with multiple answer candidates. In some embodiments, when the top passage's confidence score exceeds a first threshold it is displaced. In some embodiments, when aspects the top passage's confidence score exceeds a second, more stringent threshold, those aspects of the top passage are highlighted as the best answer while less confident scores are otherwise enhanced (e.g., bolded).

Figure 4:
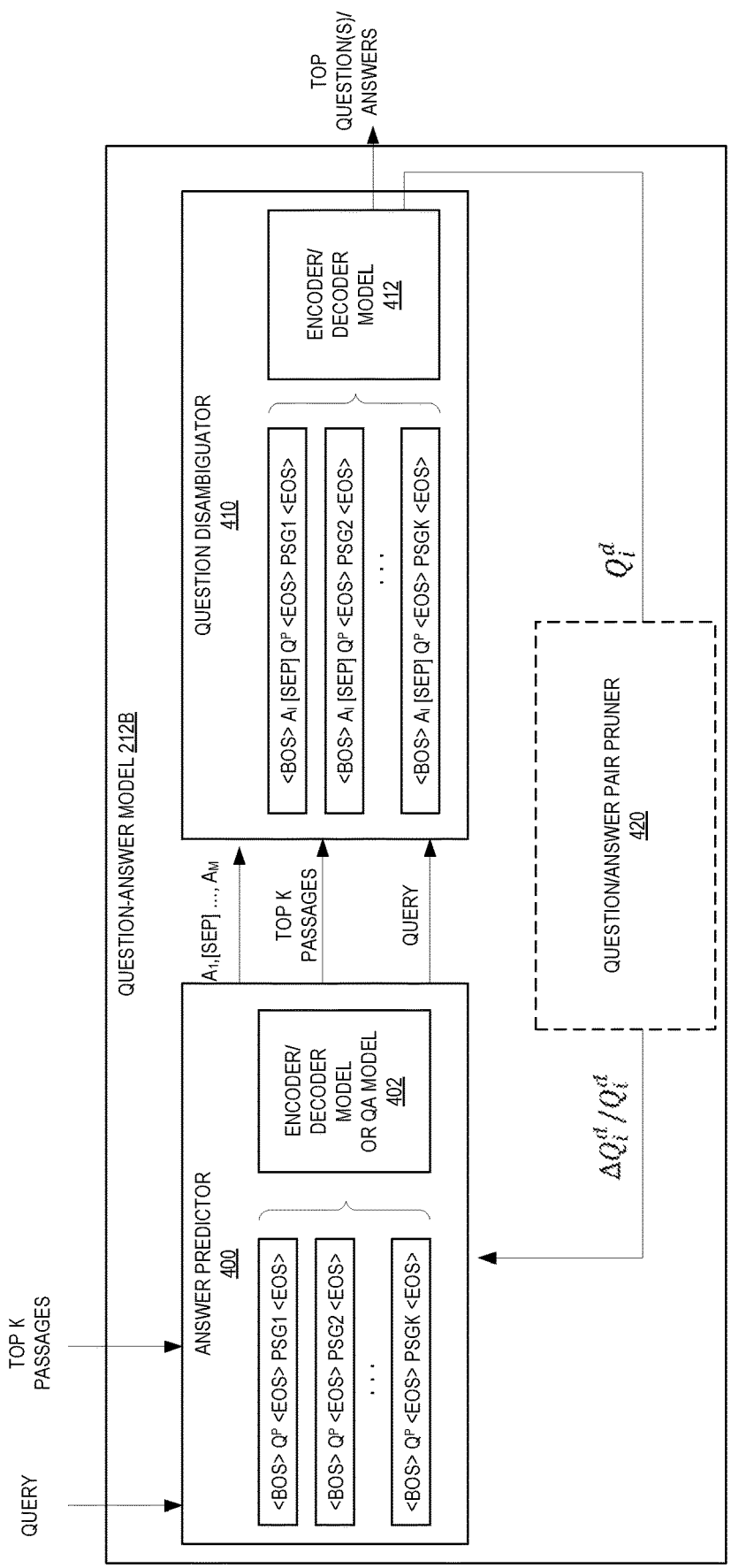
FIG. 4 illustrates embodiments of a question-answer model.

FIG. 4 illustrates embodiments of a question-answer model. For example, some embodiments, the question-answer model is question-answer model 212B. For a given prompt query (or question) Qp, the question-answer model receives K passages. Typically, these K passages are ranked. As such, the top K passages and the prompt question $Q^p$ are fed to the question-answer model 212B. The question-answer model 212B includes an answer predictor 400 that predicts one or multiple answers for each question it receives. If more than one answer is predicted, a question disambiguator 410 module predicts a disambiguated question $Q^d$ for each predicted answer $A_i$ and these question-answer pairs are fed back into the answer predictor 400. This process repeats until a satisfactory number of question-answer pairs are found. In some instances, this number may be as small as 1.

The answer predictor 400, in some embodiments, uses an encoder/decoder architecture (e.g., BERT or BART). This illustration shows a BART-based variant. A BART architecture is a denoising autoencoder which includes a bi-directional encoder which feeds an autoregressive decoder. In some embodiments, the answer predictor 400 processes each passage independently in an encoder, and jointly in a decoder. As shown, the encoder/decoder model 402 encodes concatenation of the prompt question and the passage one at a time. Then all encoded token-level representations are concatenated into a single sequence, and the decoder of the encoder/decoder model 402 performs attention over all passages to aggregate and combine evidence. Finally, the encoder/decoder model 402 decoder predicts a sequence of plausible answers token-by-token, separated by [September]. As there is no cross-passage attention in the encoder, the encoder/decoder model 402 encoder reduces the computation from quadratic in the number of input passages to linear complexity. In other embodiments, the answer predictor 400 utilizes a trained open domain QA model such as SQaAD, TREC, WebQuestions, etc. When using a QA model, the answer predictor 400 receives the question and a list of retrieved passages.

When multiple answers are predicted, the question disambiguator 410 predicts a disambiguated rewriting of the prompt question for each predicted answer $Q_i^d$. Because it is not known which input passage is the key evidence to derive the predicted answer, the question disambiguator 410 takes the same passages in the answer prediction stage as inputs. The question disambiguator 410 processes the inputs under the same fashion as the answer predictor 400 except that encoder/decoder model 412 encoder takes the concatenation of the predicted answer, prompt question, and passage as inputs.

Although the question-answer can transform the ambiguous prompt question into multiple disambiguated question-answer pairs, it might be difficult to find every possible interpretation in the first prediction pass. As such, a proposed round-trip prediction is used. To perform round-trip prediction, in some embodiments the same retrieved and reranked passages are used along with at least a proper subset of predicted disambiguated questions until there are no newly predicted answers (or a threshold of answers) have been predicted. To perform round-trip prediction, in some embodiments a new retrieval and ranking of passages is performed and those passages are used along with at least a proper subset of predicted disambiguated questions until there are no newly predicted answers (or a threshold of answers) have been predicted.

In some embodiments, the number of question-answer pairs are pruned using a question-answer pair pruner 420. In some embodiments, a hard filter is used to prune. In some embodiments, instead of having a hard filtering standard to determine what the proper subset of predicted disambiguated questions to pass along to the answer predictor 400, Language Model (LM) verification approach is used by the question-answer pair pruner 420. LM verification is a conditional probability-based approach to filter out QA pairs softly. In LM verification, a conditional language model is trained using known disambiguated QA pairs. The conditional language model is trained to estimate the likelihood of the answer given the known disambiguated questions. Once training is done, it is used to score each predicted QA pair to determine the likelihood of the answer a given the question q and passages. In some embodiments, the LM score is determined by:

$$LM \text{ score} = \sum_{i=1}^{N_a} \log p(a^i \mid q, \text{passages}),$$

where Na is the length of the predicted answer. The question-answer pair pruner 420 reranks the predicted QA pairs according to their LM scores, and drops QA pairs according to a threshold. In other embodiments, exact match (EM) verification is used to prune QA pairs. The output of the QA pair pruner 420, as such, may be $Q_i^d$ or a variant (proper subset) $\Delta Q_i^d$.

Figure 5:
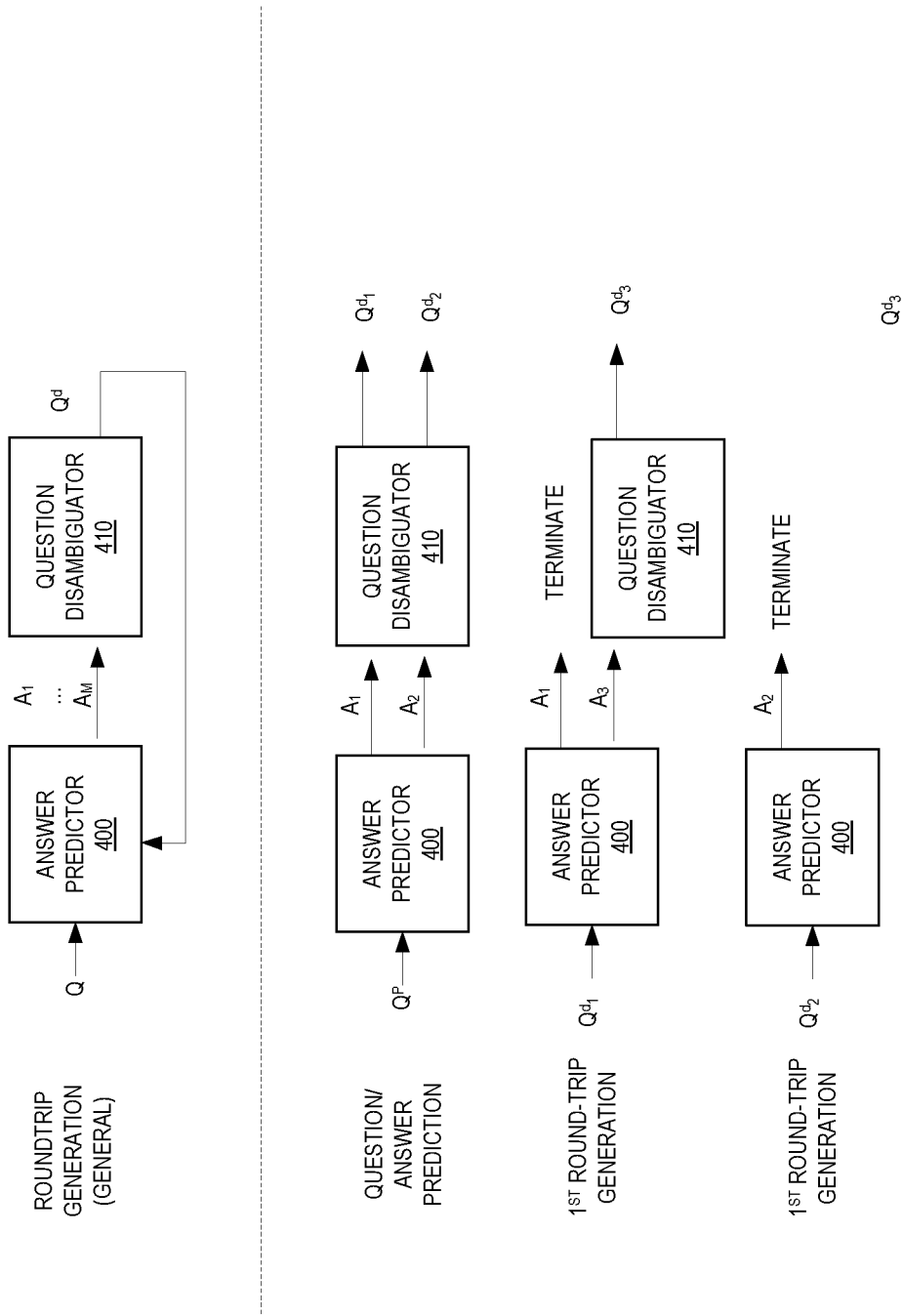
FIG. 5 illustrates embodiments of roundtrip generation.

FIG. 5 illustrates embodiments of roundtrip generation. Above the dashed line is a general depiction of roundtrip generation. As shown, the answer predictor 400 takes in a question, provides one or more answers, and the question disambiguator 410 provides one or more questions to feed back in.

Below the dashed line show what happens initially and what happens after a first roundtrip. As shown, there are two answers to the question in the initial round. The question disambiguator 410 predicts two QA pairs of the ambiguous prompt question. When feeding Qd to the Answer Prediction module again (1st roundtrip Prediction), the answer predictor determines that besides the previously predicted answer A1, a new answer candidate A3 is predicted. In this example A1, is not as good as A3. The question disambiguator 410 predicts a corresponding disambiguated question for A3. This loop typically continues until there are no new answers predicted from the answer predictor 400.

Figure 6:
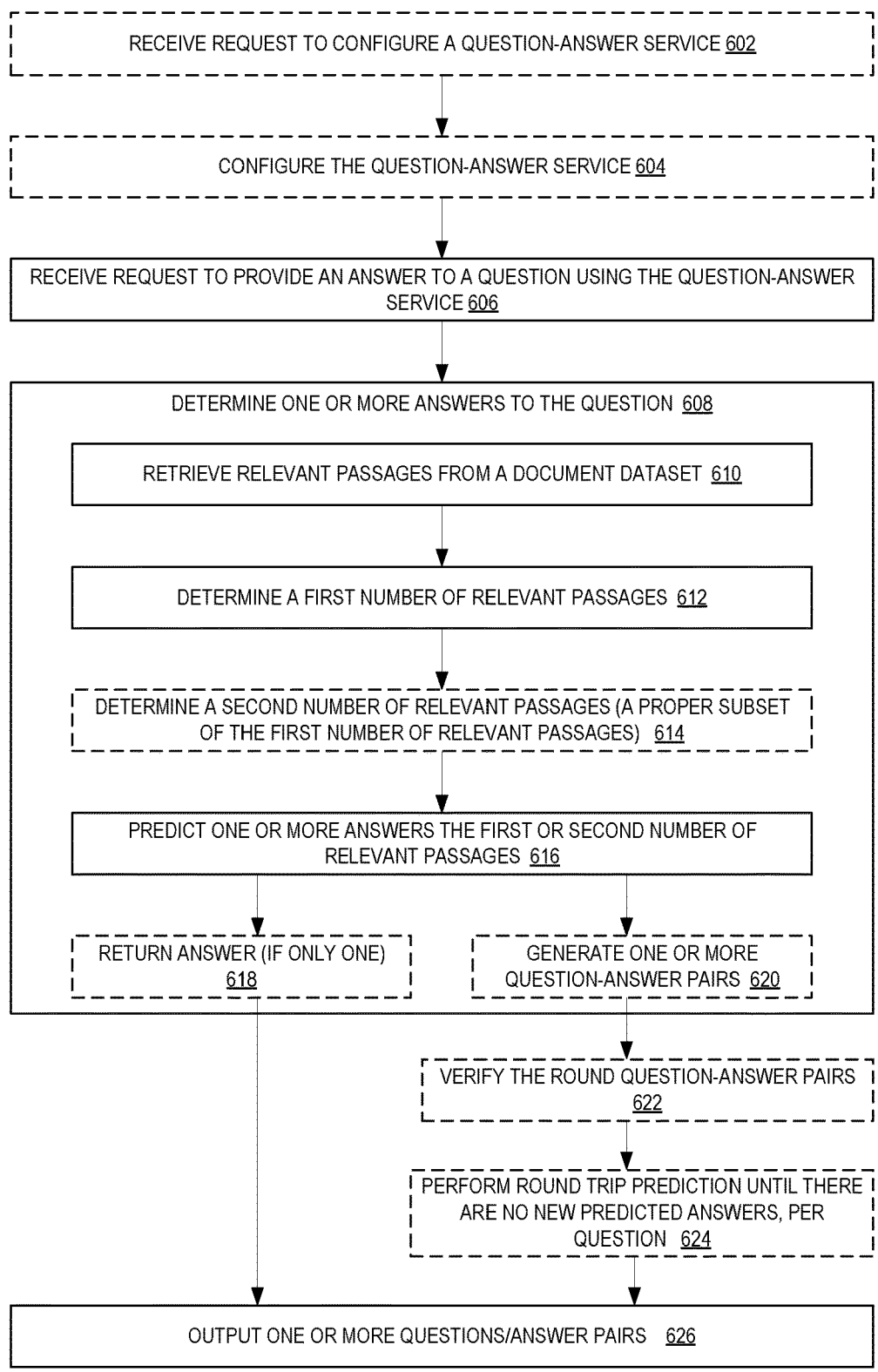
FIG. 6 is a flow diagram illustrating operations of a method for at least determining a question-answer pair according to some embodiments.

FIG. 6 is a flow diagram illustrating operations of a method for at least determining a question-answer pair according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the search service 102 of the other figures. Note that while "service" is used herein, the question-answer model may be implemented in a non-service context.

At 602 a request to configure a question-answer model is received in some embodiments. The request may include one or more of an identifier of a location of documents or passages to be used to answer questions, a set of documents or passages to be used to answer questions, a threshold value to use during question-answer pruning, etc. Note that the question-answer model may be a part of a larger enterprise search service.

At 604 the question-answer model is configured in some embodiments. For example, the question-answer model is configured to use a particular set of indexes, storage location, etc.

At 606 a request to provide an answer to a question using the question-answer model is received. This request includes at least the question. In some embodiments, the request also includes one or more of an indication of the data source(s) to use to answer the question, a maximum number of answers to receive, an indication of how the answer is to be presented (e.g., underlined in a passage, highlighted in a passage, redirection to the answer, etc.).

One or more answers to the question are predicted at 608. In particular, given a set of one or more data sources, one or more answers to the question are predicted, for example, by a question-answer model such as question-answer model 212B. To determine the one or more answers, one or more actions are performed.

A set of relevant passages from a dataset is retrieved at 610. For example, a document/passage ranking model is used to retrieve a set of passages from a document source. Examples of how this may be accomplished are detailed above. Note, as discussed above, the document/passage ranking model may be a part of a question-answer model/module.

A first number of relevant passages from the retrieved set of passages is determined at 612. For example, document/passage ranking model may perform this action. Examples of how this may be accomplished are detailed above. For example, in some embodiments, potential passages are mapped into d-dimensional vectors, a representation of the prompt question is computed, and N passages whose vectors are closest to the question vector are retrieved.

In some embodiments, a second number of relevant passages (a proper subset of the first number of relevant passages) to evaluate is determined at 614. For example, a BERT-based model may be used to rerank the N passages and the top K passages are predicted.

One or more answers the first or second number of relevant passages are predicted at 616. For example, an answer predictor predicts for the query and K (or N) passages) one or more answers.

When only one answer is predicted, it is returned at 618 and output (typically along with the question) at 626. This output may come in many forms such as highlighting the answer in a passage. When multiple potential answers are predicted, one or more question-answer pairs are generated at 620. For example, the question disambiguator 410 generates these pairs.

The generated question-answer pairs are verified at 624 in some embodiments. Verification may result in some of the filtering of question-answer pairs. One or more round trip predictions are performed until there are no new predicted answers at 622 when there are multiple question-answer pairs generated. Note that no new predicted answers may still mean that there are multiple answers to provide. At 626 one or more questions/answer pairs are output after round trip prediction stops.

Figure 7:
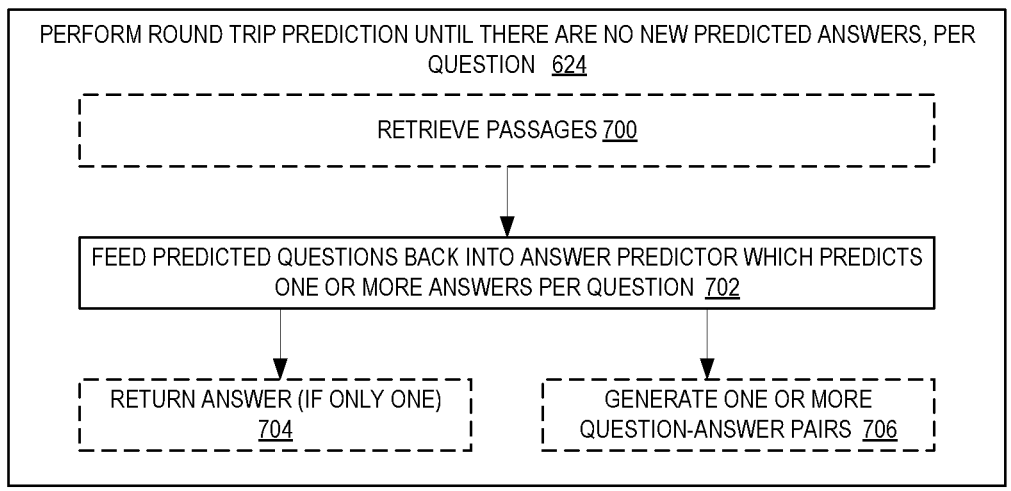
FIG. 7 is a flow diagram illustrating operations of a method for roundtrip prediction for a question according to some embodiments.

FIG. 7 is a flow diagram illustrating operations of a method for roundtrip prediction for a question according to some embodiments. Some or all of the operations (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations are performed by the search service 102 of the other figures. Note that while "service" is used herein, the question-answer model may be implemented in a non-service context.

In some embodiments, at 700 a potentially different set of passages are retrieved, ranked, etc. for the question.

At 702 the generated question is fed back into the answer predictor which predict one or more answers for the generated question using the previously retrieved passages or the passages retrieved at 700.

When only one answer is predicted, it is returned at 704. When multiple potential answers are predicted, one or more question-answer pairs are predicted at 706. For example, the question disambiguator 410 predicts these pairs.

Figure 8:
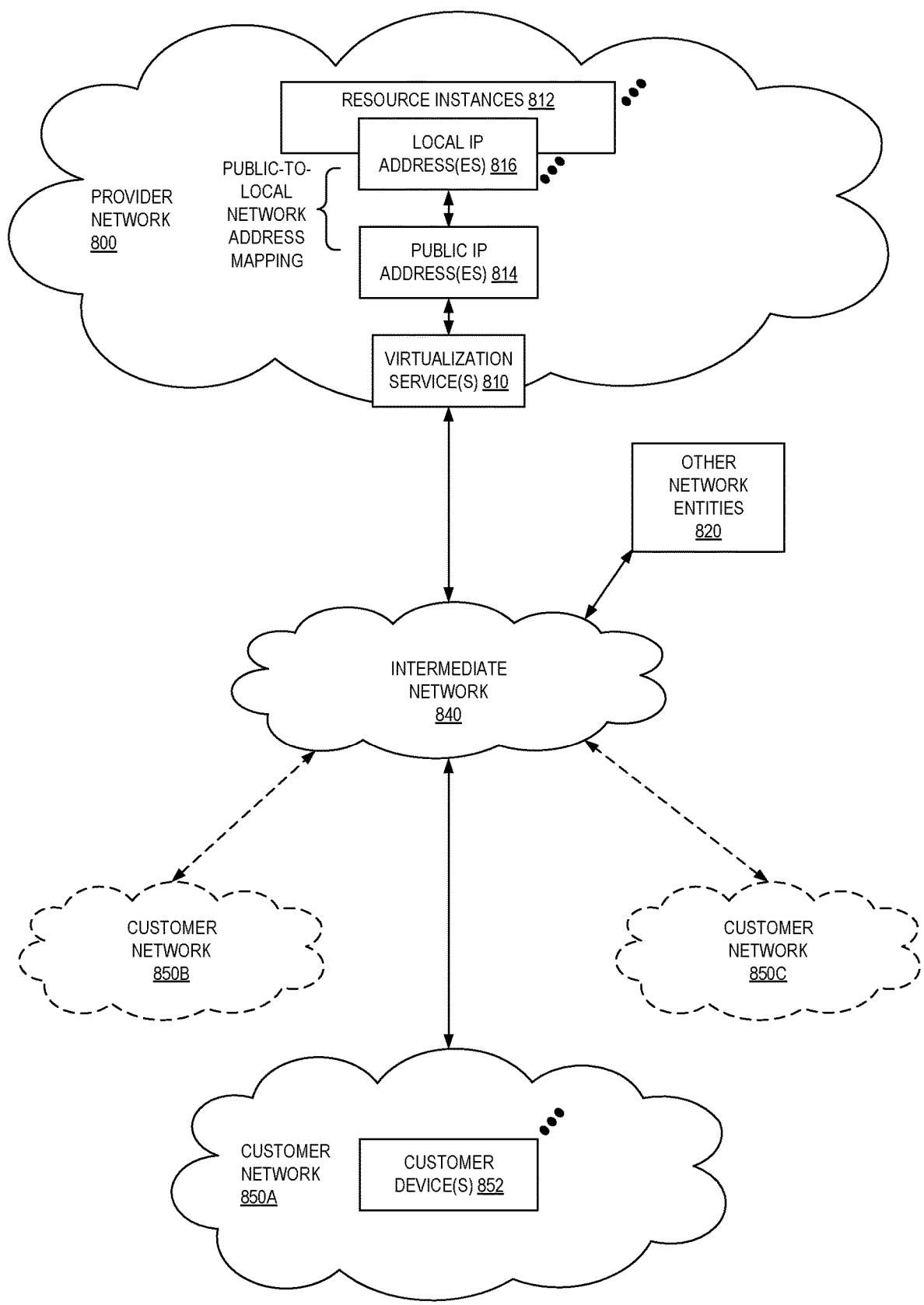
FIG. 8 illustrates an example provider network environment according to some embodiments.

FIG. 8 illustrates an example provider network (or "service provider system") environment according to some embodiments. A provider network 800 may provide resource virtualization to customers via one or more virtualization services 810 that allow customers to purchase, rent, or otherwise obtain instances 812 of virtualized resources, including but not limited to computation and storage resources, implemented on devices within the provider network or networks in one or more data centers. Local Internet Protocol (IP) addresses 816 may be associated with the resource instances 812; the local IP addresses are the internal network addresses of the resource instances 812 on the provider network 800. In some embodiments, the provider network 800 may also provide public IP addresses 814 and/or public IP address ranges (e.g., Internet Protocol version 4 (IPv4) or Internet Protocol version 6 (IPv6) addresses) that customers may obtain from the provider 800.

Conventionally, the provider network 800, via the virtualization services 810, may allow a customer of the service provider (e.g., a customer that operates one or more client networks 850A-850C including one or more customer device(s) 852) to dynamically associate at least some public IP addresses 814 assigned or allocated to the customer with particular resource instances 812 assigned to the customer. The provider network 800 may also allow the customer to remap a public IP address 814, previously mapped to one virtualized computing resource instance 812 allocated to the customer, to another virtualized computing resource instance 812 that is also allocated to the customer. Using the virtualized computing resource instances 812 and public IP addresses 814 provided by the service provider, a customer of the service provider such as the operator of customer network(s) 850A-850C may, for example, implement customer-specific applications and present the customer's applications on an intermediate network 840, such as the Internet. Other network entities 820 on the intermediate network 840 may then generate traffic to a destination public IP address 814 published by the customer network(s) 850A-850C; the traffic is routed to the service provider data center, and at the data center is routed, via a network substrate, to the local IP address 816 of the virtualized computing resource instance 812 currently mapped to the destination public IP address 814. Similarly, response traffic from the virtualized computing resource instance 812 may be routed via the network substrate back onto the intermediate network 840 to the source entity 820.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 800; a customer may then assign their allocated public IP addresses to particular resource instances allocated to the customer. These public IP addresses may be referred to as customer public IP addresses, or simply customer IP addresses. Instead of being assigned by the provider network 800 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 9:
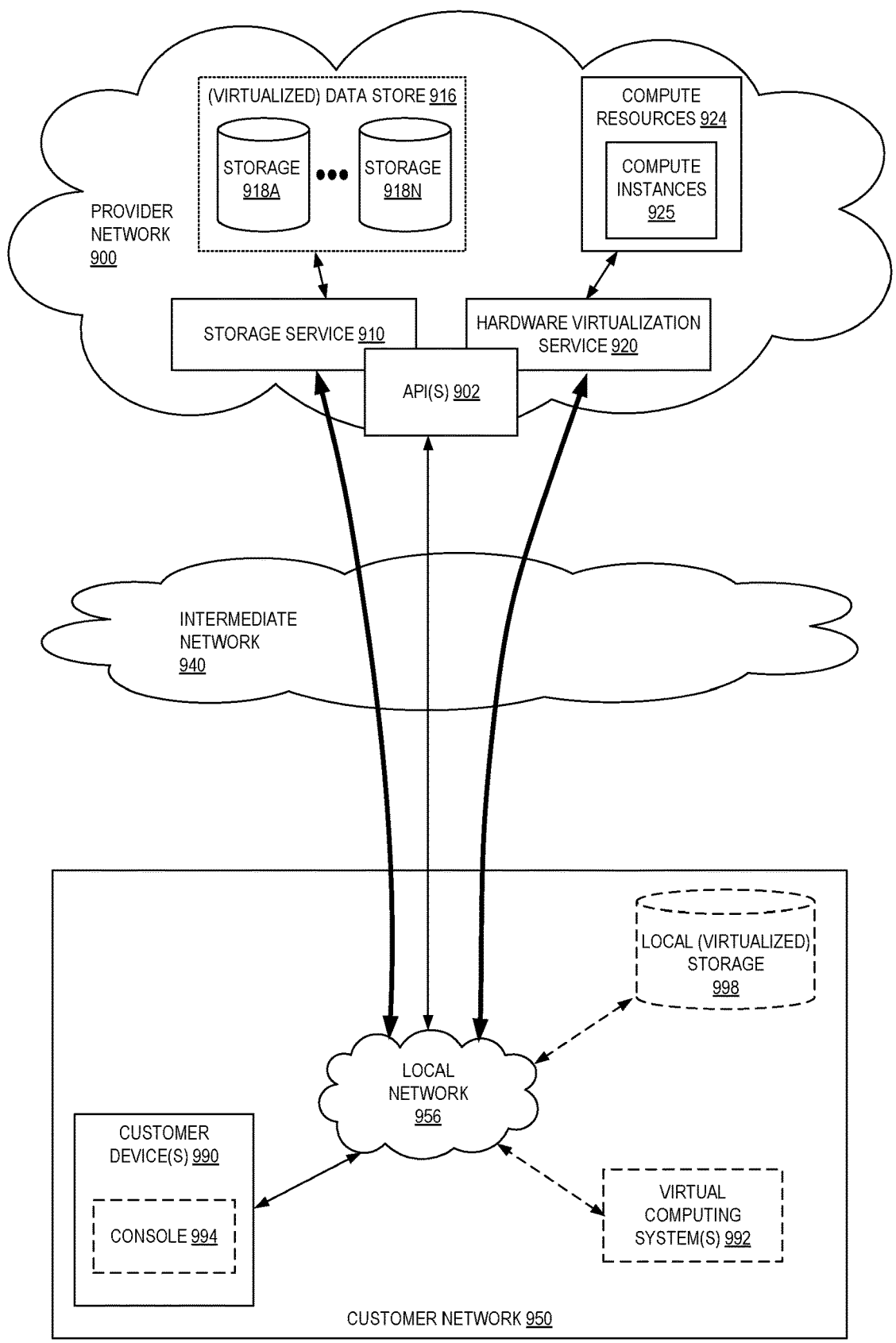
FIG. 9 is a block diagram of an example provider network that provides a storage service and a hardware virtualization service to customers according to some embodiments.

FIG. 9 is a block diagram of an example provider network that provides a storage service and a hardware virtualization service to customers, according to some embodiments. Hardware virtualization service 920 provides multiple compute resources 924 (e.g., compute instances 925 such as VMs) to customers. The compute resources 924 may, for example, be rented or leased to customers of the provider network 900 (e.g., to a customer that implements customer network 950). Each computation resource 924 may be provided with one or more local IP addresses. Provider network 900 may be configured to route packets from the local IP addresses of the compute resources 924 to public Internet destinations, and from public Internet sources to the local IP addresses of compute resources 924.

Provider network 900 may provide a customer network 950, for example coupled to intermediate network 940 via local network 956, the ability to implement virtual computing systems 992 via hardware virtualization service 920 coupled to intermediate network 940 and to provider network 900. In some embodiments, hardware virtualization service 920 may provide one or more APIs 902, for example a web services interface, via which a customer network 950 may access functionality provided by the hardware virtualization service 920, for example via a console 994 (e.g., a web-based application, standalone application, mobile application, etc.). In some embodiments, at the provider network 900, each virtual computing system 992 at customer network 950 may correspond to a computation resource 924 that is leased, rented, or otherwise provided to customer network 950.

From an instance of a virtual computing system 992 and/or another customer device 990 (e.g., via console 994), the customer may access the functionality of storage service 910, for example via one or more APIs 902, to access data from and store data to storage resources 918A-918N of a virtual data store 916 (e.g., a folder or "bucket", a virtualized volume, a database, etc.) provided by the provider network 900. In some embodiments, a virtualized data store gateway (not shown) may be provided at the customer network 950 that may locally cache at least some data, for example frequently-accessed or critical data, and that may communicate with storage service 910 via one or more communications channels to upload new or modified data from a local cache so that the primary store of data (virtualized data store 916) is maintained. In some embodiments, a user, via a virtual computing system 992 and/or on another customer device 990, may mount and access virtual data store 916 volumes via storage service 910 acting as a storage virtualization service, and these volumes may appear to the user as local (virtualized) storage 998.

While not shown in FIG. 9, the virtualization service(s) may also be accessed from resource instances within the provider network 900 via API(s) 902. For example, a customer, appliance service provider, or other entity may access a virtualization service from within a respective virtual network on the provider network 900 via an API 902 to request allocation of one or more resource instances within the virtual network or within another virtual network.

Illustrative Systems

Figure 10:
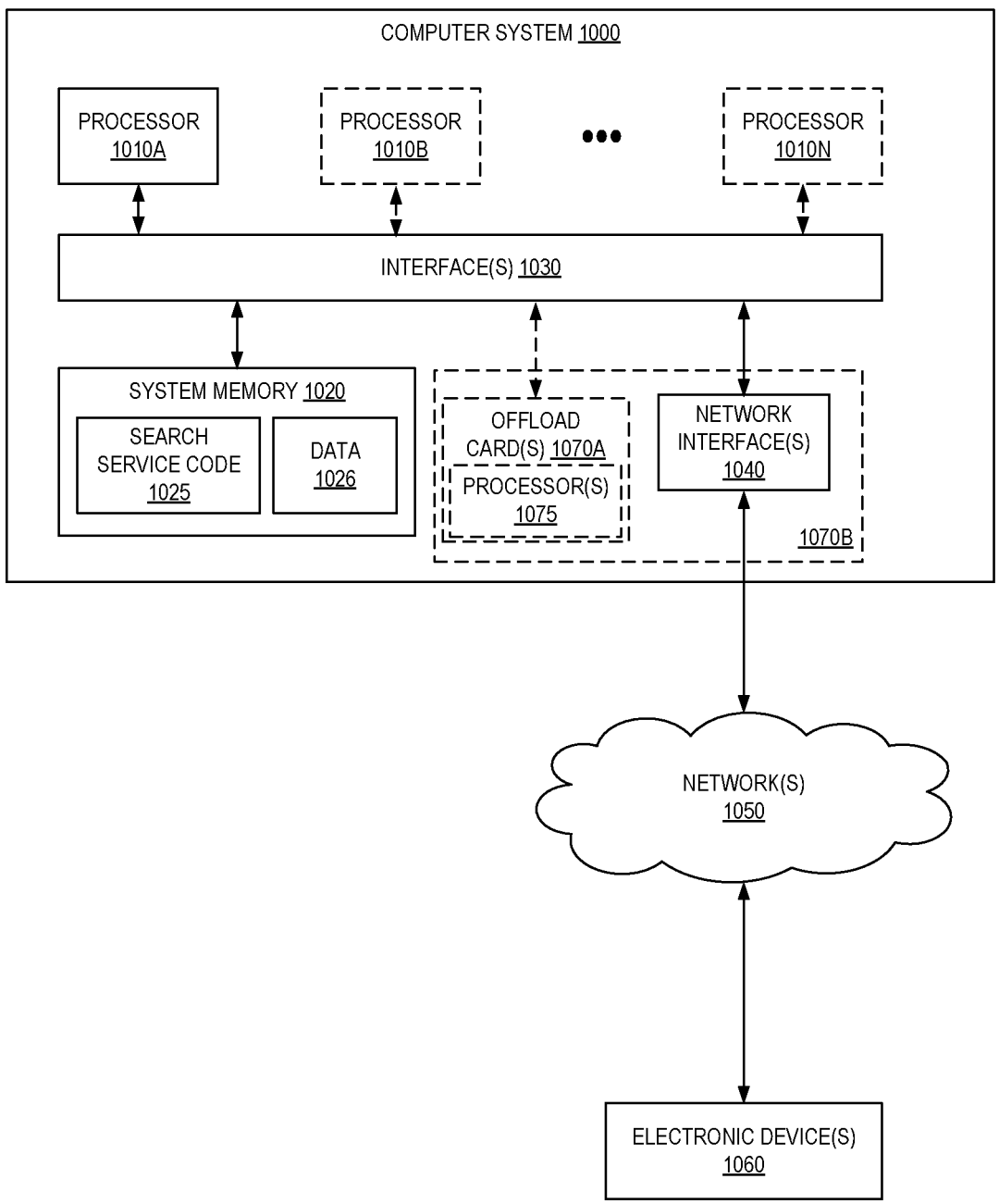
FIG. 10 is a block diagram illustrating an example computer system that may be used in some embodiments.

In some embodiments, a system that implements a portion or all of the techniques described herein may include a general-purpose computer system that includes or is configured to access one or more computer-accessible media, such as computer system 1000 illustrated in FIG. 10. In the illustrated embodiment, computer system 1000 includes one or more processors 1010 coupled to a system memory 1020 via an input/output (I/O) interface 1030. Computer system 1000 further includes a network interface 1040 coupled to I/O interface 1030. While FIG. 10 shows computer system 1000 as a single computing device, in various embodiments a computer system 1000 may include one computing device or any number of computing devices configured to work together as a single computer system 1000.

In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1010 may commonly, but not necessarily, implement the same ISA.

System memory 1020 may store instructions and data accessible by processor(s) 1010. In various embodiments, system memory 1020 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1020 as search service code 1025 (e.g., executable to implement, in whole or in part, the search service 102) and data 1026.

In one embodiment, I/O interface 1030 may be configured to coordinate I/O traffic between processor 1010, system memory 1020, and any peripheral devices in the device, including network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments some or all of the functionality of I/O interface 1030, such as an interface to system memory 1020, may be incorporated directly into processor 1010.

Network interface 1040 may be configured to allow data to be exchanged between computer system 1000 and other devices 1060 attached to a network or networks 1050, such as other computer systems or devices as illustrated in FIG. 1, for example. In various embodiments, network interface 1040 may support communication via any suitable wired or wireless general data networks, such as types of Ethernet network, for example. Additionally, network interface 1040 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1000 includes one or more offload cards 1070A or 1070B (including one or more processors 1075, and possibly including the one or more network interfaces 1040) that are connected using an I/O interface 1030 (e.g., a bus implementing a version of the Peripheral Component Interconnect Express (PCI-E) standard, or another interconnect such as a QuickPath interconnect (QPI) or UltraPath interconnect (UPI)). For example, in some embodiments the computer system 1000 may act as a host electronic device (e.g., operating as part of a hardware virtualization service) that hosts compute resources such as compute instances, and the one or more offload cards 1070A or 1070B execute a virtualization manager that can manage compute instances that execute on the host electronic device. As an example, in some embodiments the offload card(s) 1070A or 1070B can perform compute instance management operations such as pausing and/or un-pausing compute instances, launching and/or terminating compute instances, performing memory transfer/copying operations, etc. These management operations may, in some embodiments, be performed by the offload card(s) 1070A or 1070B in coordination with a hypervisor (e.g., upon a request from a hypervisor) that is executed by the other processors 1010A-1010N of the computer system 1000. However, in some embodiments the virtualization manager implemented by the offload card(s) 1070A or 1070B can accommodate requests from other entities (e.g., from compute instances themselves), and may not coordinate with (or service) any separate hypervisor.

In some embodiments, system memory 1020 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1000 via I/O interface 1030. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). Similarly, language such as "at least one or more of A, B, and C" (or "one or more of A, B, and C") is intended to be understood to mean A, B, or C, or any combination thereof (e.g., A, B, and/or C). As such, disjunctive language is not intended to, nor should it be understood to, imply that a given embodiment requires at least one of A, at least one of B, and at least one of C to each be present.

Unless otherwise explicitly stated, articles such as "a" or "an" should generally be interpreted to include one or multiple described items. Accordingly, phrases such as "a device configured to" or "a computing device" are intended to include one or multiple recited devices. Such one or more recited devices can be collectively configured to carry out the stated operations. For example, "a processor configured to carry out operations A, B, and C" can include a first processor configured to carry out operation A working in conjunction with a second processor configured to carry out operations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
receiving a request to predict an answer to a question using a question-answer model;
predicting one or more answers to the question by:
predicting at least two answers to the question from a set of ranked passages using a first encoder/decoder model of the question-answer model, wherein an input to the first encoder/decoder model comprises a concatenation of the question and each passage, and wherein the first encoder/decoder model processes each passage of the set of ranked passages independently in an encoder of the first encoder/decoder model and jointly in a decoder of the encoder/decoder model,
generating, using a second encoder/decoder model of the question-answer model, at least one question for each of the predicted at least two answers,
performing roundtrip question-answer pair prediction, wherein performing roundtrip question-answer pair prediction comprises:
feeding at least a proper subset of the generated questions back to the first encoder/decoder model of the question answer model, wherein the at least a proper subset of the generated questions comprises less than all or all of the generated questions,
predicting at least one answer to each question of the at least proper subset of the generated questions using the first encoder/decoder model of the question-answer model from the set of ranked passages, and
generating, when there are multiple predicted answers to any question of the at least proper subset of generated questions, using the second encoder/decoder model of the question-answer model, at least one question for each of the predicted multiple answers, wherein each generated question that has only one predicted answer and the only one predicted answer form a question-answer pair to potentially be presented as a predicted result, and
continuing performing roundtrip question-answer pair prediction until each generated question fed back to the first encoder/decoder model has only one predicted answer; and
providing at least a proper subset of the question-answer pairs.

2. The computer-implemented method of claim 1, wherein the request includes at least the question and one or more of an indication of a data source to use to answer the question, a maximum number of answers to receive, or an indication of how the answer is to be presented.

3. A computer-implemented method comprising:
receiving a request to predict an answer to a question using a question-answer model;
predicting one or more answers to the question by:
predicting at least two answers to the question from a set of passages using a first component of the question-answer model, wherein an input to the first component comprises a concatenation of the question and each passage of the set of passages, and wherein the first component processes each passage of the set of passages independently in an encoder of the first component and jointly in a decoder of the first component,
generating, using a second component of the question-answer model, at least one question for each of the predicted at least two answers,
performing roundtrip question-answer pair prediction, wherein performing roundtrip question-answer pair prediction comprises:
feeding at least a proper subset of the generated questions back to the first component of the question answer model,
predicting at least one answer to each question of the at least proper subset of the generated questions using the first component of the question-answer model from the set of passages, and
generating, when there are multiple predicted answers to any question of the at least proper subset of the generated questions, using the second component of the question-answer model, at least one question for each of the multiple predicted answers, wherein each generated question that has only one predicted answer and the only one predicted answer form a question-answer pair to potentially be presented as a predicted result, and
continuing the performing roundtrip question-answer pair prediction until each generated question fed back to the first component of the question answer model has only one predicted answer; and
providing at least a proper subset of the question-answer pairs.

4. The computer-implemented method of claim 3, wherein the set of passages is a subset of passages retrieved from storage that have been ranked.

5. The computer-implemented method of claim 4, wherein the ranking is performed by an encoder/decoder based model.

6. The computer-implemented method of claim 3, further comprising:
verifying and filtering the generated questions prior to feeding the at least a proper subset of the generated questions to the first component of the question answer model.

7. The computer-implemented method of claim 6, wherein the verifying and filtering is performed using language model verification.

8. The computer-implemented method of claim 6, wherein the verifying and filtering is performed using exact match verification.

9. The computer-implemented method of claim 3, wherein an input to the first component of the question-answer model comprises one of a combination of a question and each passage or the question and a list of retrieved passages.

10. The computer-implemented method of claim 3, wherein an input to the second component of the question-answer model comprises a concatenation of a question, each passage, and a predicted answer.

11. The computer-implemented method of claim 3, wherein the second component utilizes a bidirectional encoder that feeds an autoregressive decoder.

12. The computer-implemented method of claim 3, wherein providing at least a proper subset of the question-answer pairs comprises highlighting each answer in a relevant passage.

13. The computer-implemented method of claim 3, wherein the request includes at least the question and one or more of an indication of a data source to use to answer the question, a maximum number of answers to receive, or an indication of how the answer is to be presented.

14. A system comprising:
- a first one or more electronic devices to implement a storage service in a multi-tenant provider network to store passages from documents; and
- a second one or more electronic devices to implement a search service in the multi-tenant provider network, the search service including instructions that upon execution cause the search service to:
  - receive a request to predict an answer to a question using a question-answer model;
  - predict one or more answers to the question by:
    - predicting at least two answers to the question from a set of stored passages using a first component of the question-answer model, wherein an input to the first component comprises a concatenation of the question and each passage of the set of stored passages, and wherein the first component processes each passage of the set of stored passages independently in an encoder of the first component and jointly in a decoder of the first component,
    - generating, using a second component of the question-answer model, at least one question for each of the predicted at least two answers,
    - performing roundtrip question-answer pair prediction, wherein performing roundtrip question-answer pair prediction comprises:
      - feeding at least a proper subset of the generated questions back to the first component of the question answer model,
      - predicting at least one answer to each question of the at least proper subset of the generated questions using the first component of the question-answer model from the set of passages, and
      - generating, when there are multiple predicted answers to a question of the at least proper subset of the generated questions, using the second component of the question-answer model, at least one question for each of the multiple predicted answers, wherein each generated question that has only one predicted answer and the only one predicted answer form a question-answer pair to potentially be presented as a predicted result, and
      - continuing the performing roundtrip question-answer pair prediction until each generated question fed back to the first component of the question answer model has only one predicted answer; and
  - providing at least a proper subset of the question-answer pairs.

15. The system of claim 14, wherein the set of passages is a subset of passages retrieved from storage that have been ranked.

16. The system of claim 15, wherein the ranking is performed by an encoder/decoder based model.

17. The system of claim 14, wherein the search service is further to verify and filter the generated questions prior to feeding the at least a proper subset of the generated questions to the first component of the question answer model.

18. The system of claim 14, wherein an input to the first component of the question-answer model comprises one of a combination of a question and each passage or the question and a list of retrieved passages.

19. The system of claim 14, wherein an input to the second component of the question-answer model comprises a concatenation of a question, each passage, and a predicted answer.

* * * * *